US008473377B2

(12) United States Patent
Smith et al.

(10) Patent No.: US 8,473,377 B2
(45) Date of Patent: Jun. 25, 2013

(54) DATA MANAGEMENT SYSTEM

(75) Inventors: Gerald W. Smith, Houston, TX (US); Joseph L. Luna, Spring, TX (US); Thomas C. Robinson, Katy, TX (US); Paul A. Wulf, Katy, TX (US); Hacene Benchikha, San Antonio, TX (US)

(73) Assignee: Accenture Global Services, Dublin (IE)

( * ) Notice: Subject to any disclaimer, the term of this patent is extended or adjusted under 35 U.S.C. 154(b) by 205 days.

(21) Appl. No.: 12/040,630

(22) Filed: Feb. 29, 2008

(65) Prior Publication Data

US 2009/0222361 A1 Sep. 3, 2009

(51) Int. Cl.
*G07B 17/00* (2006.01)

(52) U.S. Cl.
USPC ............. 705/30; 705/1.1; 705/14.17; 705/31; 705/35; 705/37

(58) Field of Classification Search
None
See application file for complete search history.

(56) References Cited

U.S. PATENT DOCUMENTS 5,920,848 A * 7/1999 Schutzer et al. ................ 705/42
5,970,476 A 10/1999 Fahey ............................ 705/28
6,012,042 A * 1/2000 Black et al. ................. 705/36 R
6,026,382 A * 2/2000 Kalthoff .......................... 705/35
6,078,924 A * 6/2000 Ainsbury et al. ............ 707/101
6,343,295 B1 * 1/2002 MacLeod et al. ..................... 1/1
6,513,019 B2 1/2003 Lewis ............................ 705/35
6,748,371 B1 * 6/2004 Levanoni et al. ............ 707/776
7,389,915 B1 * 6/2008 Dyor ............................ 235/380
7,634,431 B2 * 12/2009 Stratton .......................... 705/30
7,685,031 B2 * 3/2010 Albert et al. .................... 705/30
2002/0004774 A1 * 1/2002 Defarlo ........................... 705/36
2004/0098663 A1 * 5/2004 Rey et al. ...................... 715/500
2004/0107123 A1 * 6/2004 Haffner et al. .................... 705/7
2007/0244775 A1 * 10/2007 Linder ............................ 705/35

* cited by examiner

*Primary Examiner* — Fateh Obaid
(74) *Attorney, Agent, or Firm* — Mannava & Kang, P.C.

(57) ABSTRACT

A data management system may include computer code to receive data that may include financial data and related data. The computer code may store the data in a database. The financial data may include data not tracked by a general ledger, such as contractual commitments, operating leases, head count, environmental incidents, lost time, disposal of operations, etc. The financial data may be applicable to different business units. The computer code may be configured to permit access to, entry of, and sign-off on the data only by users granted authority to do so. The financial data may include different data categories, and the data management system may be configured to use a different workflow to manage the data based on the data category of the financial data. The computer code may generate reports from the data retrieved from the database.

23 Claims, 9 Drawing Sheets

| Logout | | Current Period: 4Q07 | | Data Management Tool |
|---|---|---|---|---|
| Home | Data Entry | Reports | Help | Admin |
| Admin → Financial Code Categories → View Financial Codes | | | | Logged in as: Tom Robinson |

Summary Codes

Pick a Category:  — 132

| CAT 1 | |
|---|---|
| Summary Code | Desc |
| ADD xx1 | Operating leases |
| ADD xx2 | Other contractual co |
| SUP xx1 | |
| SUP xx2 | Capital commitments |

302

| CAT 2 | |
|---|---|
| Summary Code | Desc |
| ADD xx3 | Inventory Holding Ga |
| ADD xx4 | Cash Flow Adjustment |
| ADD xx5 | Disposal of operations |
| SUP xx3 | Information On employ |
| SUP xx4 | Restricted Cash & Ca |
| SUP xx5 | Capitalized borrowin |

| CAT 3 | |
|---|---|
| Summary Code | Desc |
| ADD xx6 | Volumes |
| ADD xx7 | Joint Venture Revenue |
| ADD xx8 | Custom duties and sa |
| ADD xx9 | Equity-accounted ent |
| ADD x10 | Equity-Accounted ent |

| CAT 4 | |
|---|---|
| Summary Code | Desc |
| ADD x11 | Loans Short-term bor |
| ADD x12 | Financial Debt Shor |
| ADD x13 | Withholding taxes |
| ADD x14 | Non-current finance |
| ADD x15 | Financial Debt curre |
| ADD x16 | Acquisitions |

| CAT 5 | |
|---|---|
| Summary Code | Desc |
| ADD x17 | Volumes |
| ADD x18 | Unmatured Exchange L |
| ADD x19 | |
| ADD x20 | Inventories - US GAA |
| ADD x21 | Production Taxes paid |
| ADD x22 | Financial debt curre |

300

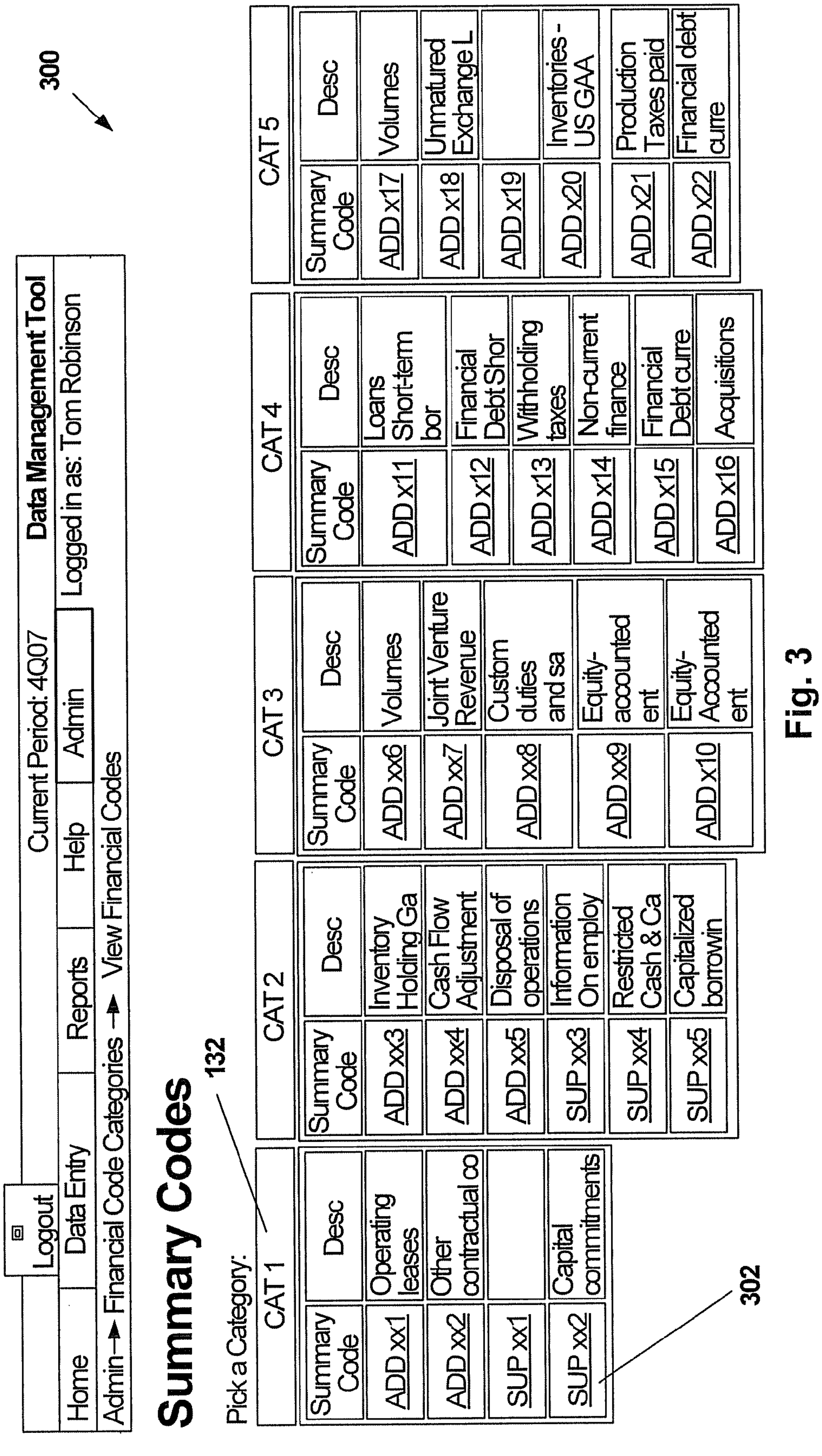

Fig. 3

Logout

Current Period: 4Q07 Data Management Tool

Home | Data Entry | Reports | Help | Admin | Logged in as: Tom Robinson

Admin → Financial Code Categories → View Financial Codes → Financial Codes Sub Category

Detail for Summary Code and Category

302

402

| Financial Code | Desc | Code Type | Summary Code | Segment | Data sign | Group Status | Data Type | Sub Category | Data Source | Value Type | Category Code | Control Xref | Comments |
|---|---|---|---|---|---|---|---|---|---|---|---|---|---|
| xx1234 | Op lease current period expense capitalized | Add | ADDxx1 | SG | + | N/A | $.000 | | BU | YTD | 1 | | E&P only |
| xx1235 | Contingent Rent in Rental Expense | Add | ADDxx1 | SG | — | Active | $.000 | SUBCAT | BU | YTD | 1 | | |
| xx1236 | Time Charter – Contingent Rent received | Add | ADDxx1 | SG | — | Active | $.000 | SUBCAT | BU | YTD | 1 | | |
| xx1237 | Op Leases Shipping Time – Rent Exp | Add | ADDxx1 | SG | + | Active | $.000 | SUBCAT | BU | YTD | 1 | | |
| xx1238 | Sublease And Contingent Rent | Add | ADDxx1 | SG | — | Active | $.000 | SUBCAT | BU | YTD | 1 | | |
| xx1239 | Contingent Rent In Rental Expense | Add | ADDxx1 | SG | — | Active | $.000 | SUBCAT | BU | YTD | 1 | | |

Admin → Financial Code Categories → View Financial Codes → Edit Financial Codes

EDIT Financial Code

| Field | Value |
|---|---|
| Financial Code: | xx1234 |
| Description: | Op lease current period expense capitalized |
| Code Type: | ADD ▶ |
| Summary Code: | ADD xx1 ▶ |
| Segment: | SG ▶ |
| Data Sign: | + ▶ |
| Reporting (Group) status: | N/A ▶ |
| Data Type: | $.000 ▶ |
| Sub Category: | |
| Data Source: | BU ▶ |
| Value Type: | YTD ▶ |
| Category Code: | 1 ▶ |
| Control Xref: | ▶ |
| Comments: | E & P only |

500

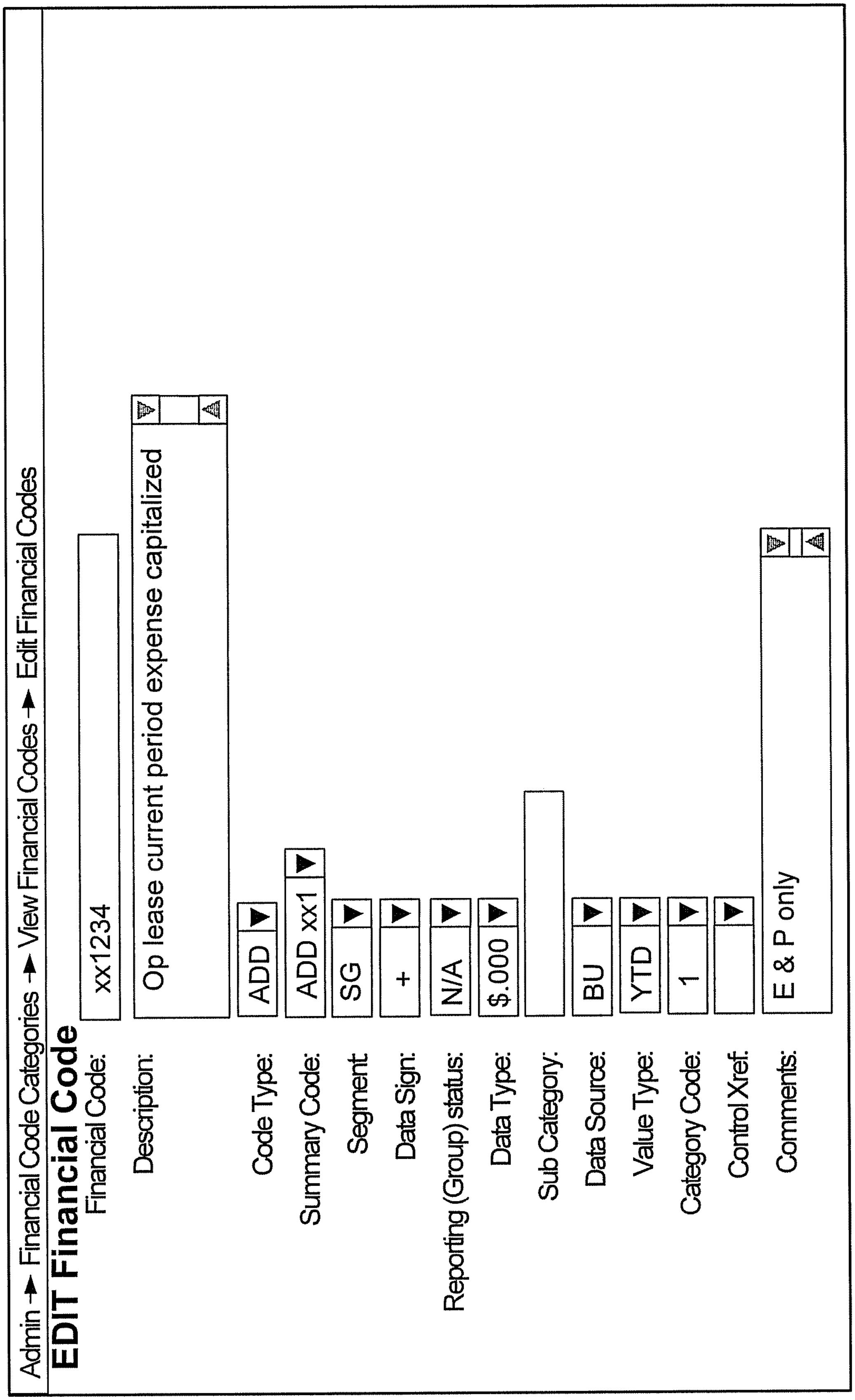

Fig. 5

| Logout | | | | | Current Period: 4Q07 | | Data Management Tool |
|---|---|---|---|---|---|---|---|
| Home | Data Entry | Reports | Help | Admin | | | Logged in as: Tom Robinson |

Select Business Unit → Business Unit Workflow → Entry for SEG1 → Pipeline Ops → Category Code Selection → Pick a Code
→ Financial Code: xx2234

Entry for: Entry for SEG1 → Pipeline Ops | Financial Code: xx2234

Detail for Financial Code: ← 704

| Description | Code Type | Summary Code | Segment | Data sign | Reporting Status | Data Type | Sub Category | Data Source | Value Type | Category Code | Control Xref | Comments | TRA Partn |
|---|---|---|---|---|---|---|---|---|---|---|---|---|---|
| Year 2 - Rental Expense | ADD | ADDxx1 | SG | + | Active | $.000 | SUBCAT | BU | YTD | 1 | | | |

View Period Data

Data Entry:

Financial Code: xx2234 ← 702

Enter 4Q07 Amount [ ] $.000 ← 706

Comments:
[ ] ← 708

[Submit] ← 710

Prior Period Values: ← 712

| Period | Trading Partner | Data Amt |
|---|---|---|
| 4Q07 | | 4,000.00 |
| 3Q07 | | 3,064.00 |
| 3Q07 | | 3,064.00 |
| 3Q07 | | 3,064.00 |
| 2Q07 | | 3,064.00 |
| 1Q07 | | 2,132.00 |
| 4Q06 | | 2,132.00 |

700

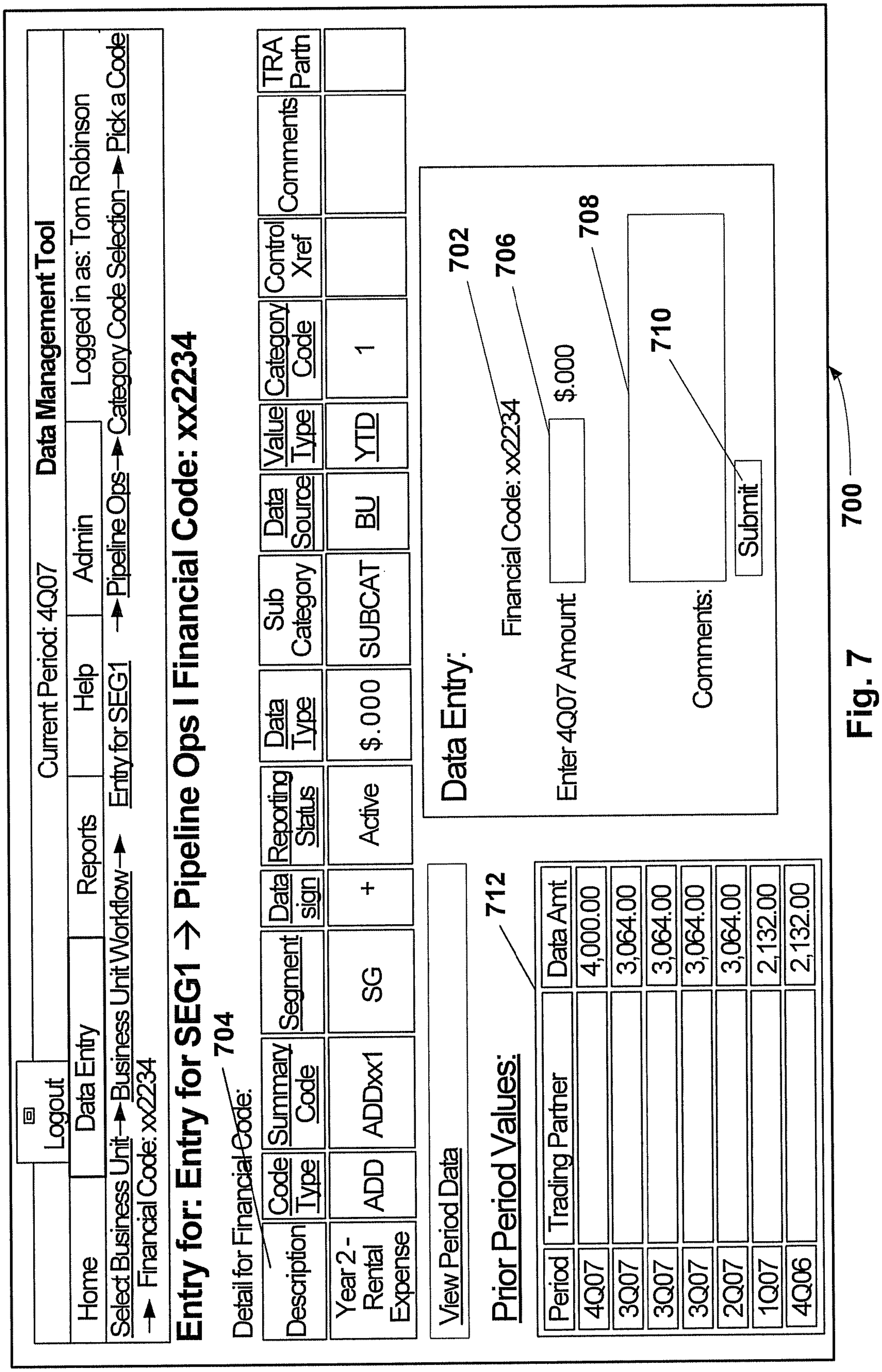

Fig. 7

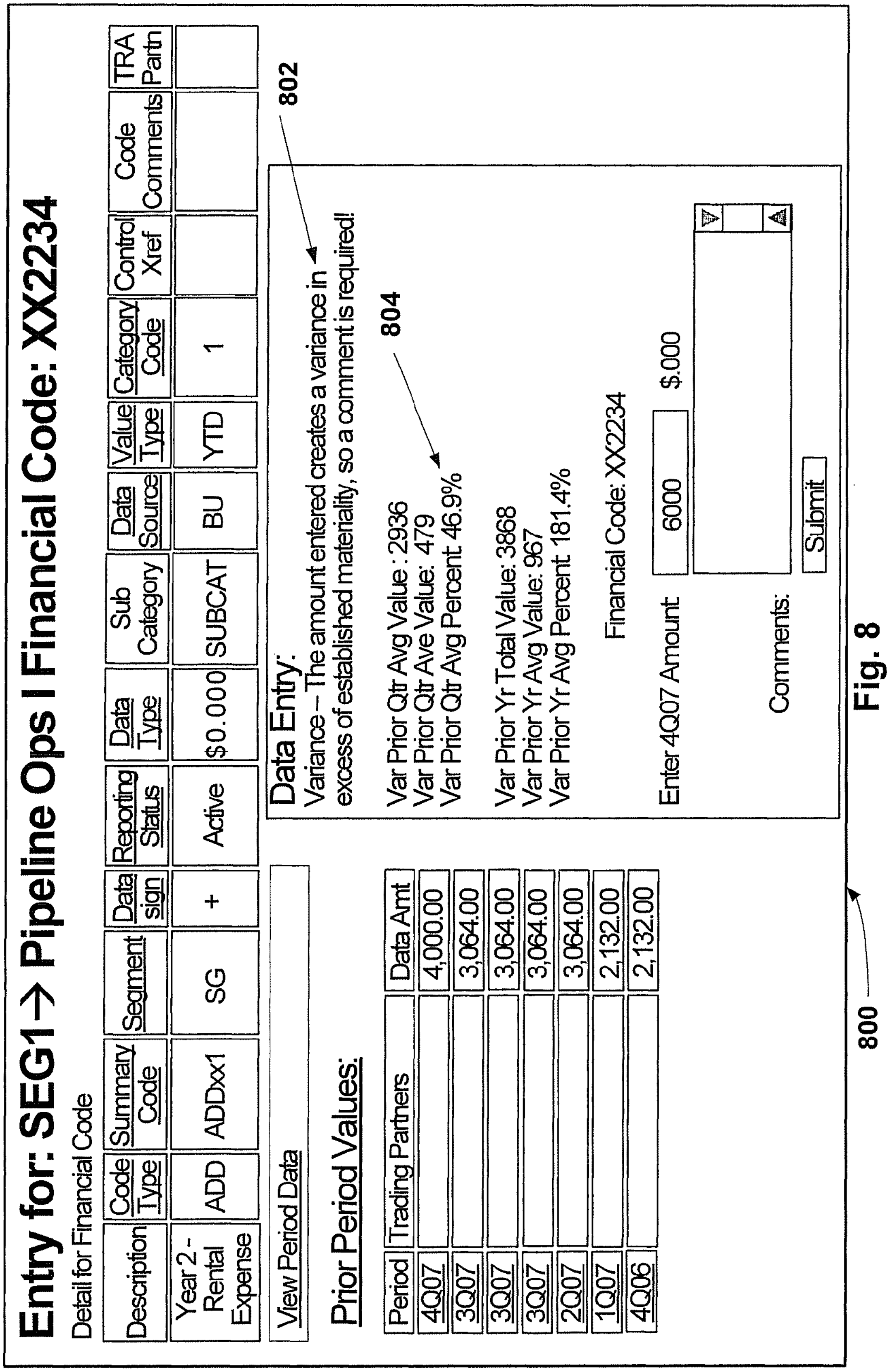

Entry for: SEG1→ Pipeline Ops I Financial Code: XX2234

Detail for Financial Code

| Description | Code Type | Summary Code | Segment | Data sign | Reporting Status | Data Type | Sub Category | Data Source | Value Type | Category Code | Control Xref | Code Comments | TRA Partn |
|---|---|---|---|---|---|---|---|---|---|---|---|---|---|
| Year 2 - Rental Expense | ADD | ADDxx1 | SG | + | Active | $0.000 | SUBCAT | BU | YTD | 1 | | | |

View Period Data

Prior Period Values:

| Period | Trading Partners | Data Amt |
|---|---|---|
| 4Q07 | | 4,000.00 |
| 3Q07 | | 3,064.00 |
| 3Q07 | | 3,064.00 |
| 3Q07 | | 3,064.00 |
| 2Q07 | | 3,064.00 |
| 1Q07 | | 2,132.00 |
| 4Q06 | | 2,132.00 |

Data Entry:
Variance -- The amount entered creates a variance in excess of established materiality, so a comment is required!

Var Prior Qtr Avg Value: 2936
Var Prior Qtr Ave Value: 479
Var Prior Qtr Avg Percent: 46.9%

Var Prior Yr Total Value: 3868
Var Prior Yr Avg Value: 967
Var Prior Yr Avg Percent: 181.4%

Financial Code: XX2234

Enter 4Q07 Amount: 6000    $.000

Comments:

Submit

DATA MANAGEMENT SYSTEM

BACKGROUND

1. Technical Field

This application relates to management of business data and, in particular, to management of financial data and data related to the financial data.

2. Related Art

Financial data of a business may be collected for various purposes. In public companies, financial data is collected and reported to the public to satisfy legal reporting requirements. Financial data may also be collected for management decision making. Often there is overlap between the financial data collected for legal reporting and the financial data collected for management decision making. However, the kinds of data collected for the two purposes may be different. The level of detail required for legal reporting of a one kind of financial data may be less than the level of detail desired for management decision making.

Existing financial systems are focused on collecting financial data for legal reporting purposes. Disparate types of businesses collect similar kinds of financial data for legal reporting purposes. Much of the financial data collected that is required for legal reporting is stored by existing financial systems in a general ledger database. The general ledger database includes transactional data, such as data relating to each sale made by a business. Often systems that manage business transactions are integrated with the general ledger database. Such systems may automatically populate the general ledger database on the completion of each transaction.

In contrast, disparate types of businesses often collect different kinds of financial data for management purposes. For example, a business involved in the manufacturing industry may want to collect financial information that is not even relevant to a business involved in the services industry. Even businesses of the same type may collect different kinds of financial data for management purposes. The reason may be that the kind of financial data considered important to one business manager may not be considered important to another business manager.

Also in contrast to legal reporting, financial data collected strictly for management decision making purposes often is related to business activities that are not tracked by any automated system. The financial data may not be transactional in nature and, consequently, not stored in the general ledger database. As a result, the financial data may be manually collected and entered into spreadsheets at various levels of a business to the extent that the financial data is even collected. The financial data may be summarized in a spreadsheet as the financial data is rolled up at the various levels of the business. The process of summarizing the data may result in losing an ability to drill down to a lower level of detail as desired in some financial analyses. Supplemental data related to the financial data may also not be available for further analysis.

Furthermore, different kinds of financial data not stored in the general ledger database may require different workflows. For example, one category of financial data may need to be entered during one time period, and another category of financial data may need to be entered during another time period. As another example, one category of financial data may need to be signed off on by a deadline different from another category of financial data. A person who has sign-off authority may be different for different business units and may be unknown to one analyzing data collected from multiple business units.

SUMMARY

A data management system may include computer code to receive data that may include financial data and data related to the financial data. The computer code may store the data as financial data entries in a database. The financial data entries may include data not tracked by a general ledger, such as contractual commitments, operating leases, head count, environmental incidents, lost time, disposal of operations, etc. The financial data may be applicable to different business units. The computer code may permit access to, entry of, and sign-off on the data only by users granted authority to do so.

The financial data entries may include different data categories, and the data management system may be configured to use a different workflow to manage the financial data entries based on the data category of the financial data entries. The computer code may be configured to permit receipt of the financial data entries during a determined time period. The determined time period may depend on the data categories included in the financial data entries. The computer code may generate reports, such as a consolidated report, from the financial data entries received from the database. A consolidated report may include data from the financial data entries applicable to different business units. The computer code may generate a report based on a data category selected by the user.

The computer code may display a list of desired user entries, where each of the desired user entries corresponds to a financial code applicable to a business unit. Financial data of each of the desired user entries may not be tracked in a general ledger. The computer code may receive financial data entries that correspond to the desired user entries. The computer code may require receipt of an explanatory text for each of the financial data entries that exceeds a determined variance value.

A method of managing data may include storing financial codes in a database and receiving financial data entries based on the financial codes having been stored in the database. A financial data entry may include financial data that is applicable to a business unit. The financial data included in the financial data entry may not be tracked in a general ledger. The method may include controlling receipt of the financial data entries using a software security layer. The method may further include storing the financial data entries in the database. The method may include generating a consolidated report from the financial data entries.

Further objects and advantages of the present invention will be apparent from the following description, reference being made to the accompanying drawings wherein preferred embodiments of the present invention are clearly shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 is an example of a graphical user interface generated by the computer code of FIG. 1 to view financial codes;

FIG. 4 is an example of a graphical user interface generated by the computer code of FIG. 1 to view financial codes associated with a selected summary code of one data category;

FIG. 5 is an example of a graphical user interface generated by the computer code of FIG. 1 to edit or create a financial code;

FIG. 7 is an example of a graphical user interface generated by the computer code of FIG. 1 to receive a manual entry of a value included in a selected financial data entry;

FIG. 8 is an example of a graphical user interface generated by the computer code of FIG. 1 to enter text to explain a variance value exceeding a determined value.

DETAILED DESCRIPTION

Figure 1:
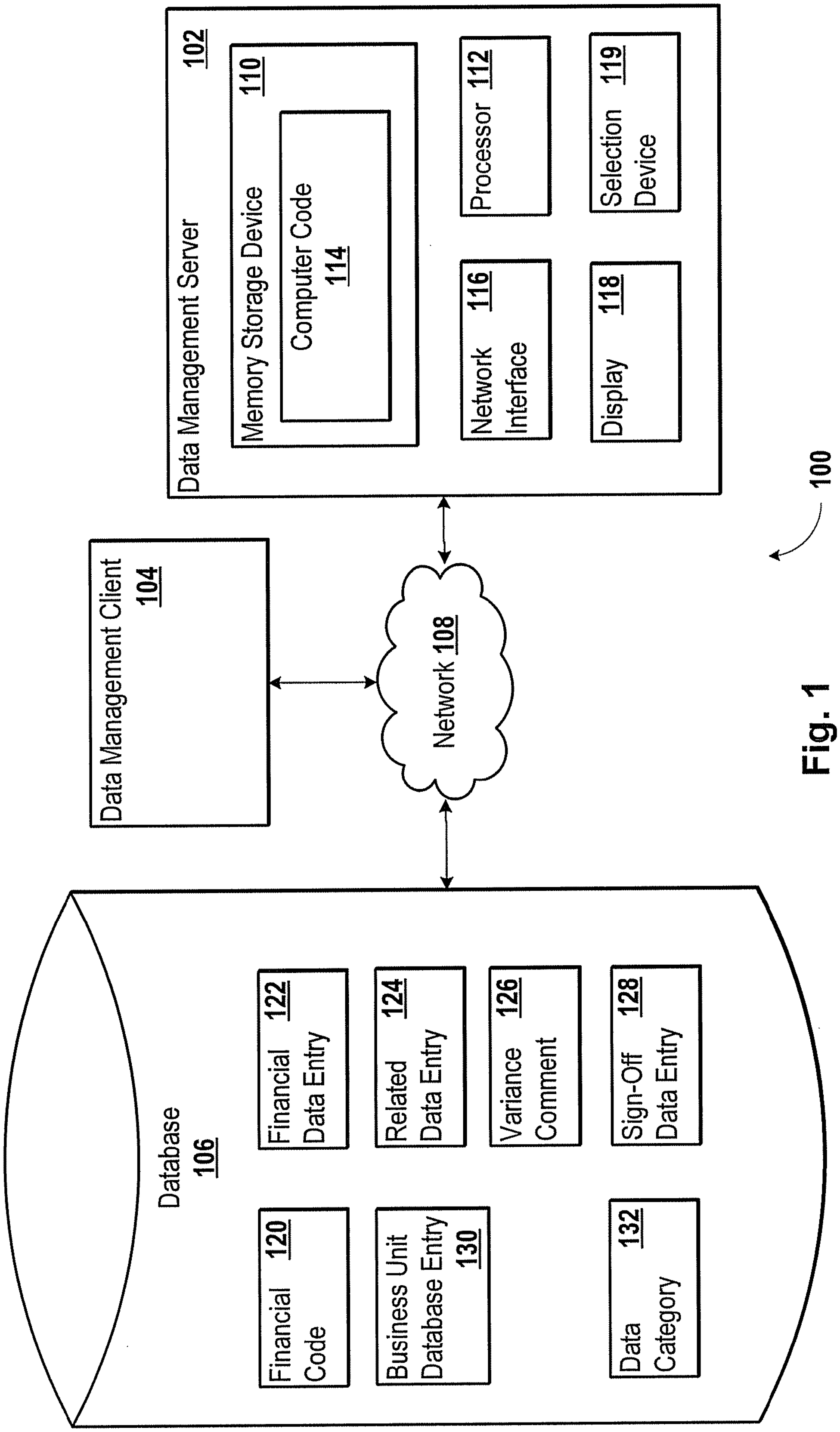
FIG. 1 is an example of a data management system to manage financial data and data related to the financial data.

FIG. 1 is an example of a data management system 100 to manage financial data and data related to the financial data. The data management system 100 can manage disparate kinds of financial data and related supplemental data not stored in the financial ledger. Management of data may include, but is not limited to, one or more of the following: receiving, storing, securing access to, and reporting the data. For example, the data management system 100 may manage financial data related to contractual commitments, operating leases, head count, environmental incidents, lost time, and disposal of operations. The system may include at least one data management server 102, at least one data management client 104, and a database 106, all connected by a network 108. In other examples, the system may include a subset of these elements, such as one data management server 102, where the data management server 102 includes a database 106 but does not include a network 108 or a data management client 104.

The data management server 102 may be any number of computers connectable to the network 108. The data management client 104 may be any number of computer or terminals connectable to the network 108 used by a data entry user, a user with read only privileges, a financial controller responsible for a business unit, or some other user of the system. In some examples, the users may interact with the data management system using the data management server 102 instead of the data management client 104.

The data management client 104 may communicate with the data management server 102 using any communication protocol, such as Hypertext Transfer Protocol (HTTP), Hypertext Transfer Protocol over Secure Socket Layer (HTTPS), Wireless Application Protocol (WAP), Simple Object Access Protocol (SOAP), etc. The network 108 may be any form of Local Area Network (LAN), Wide Area Network (WAN), etc., including wireless and wire line networks. In one example, a web browser may execute in the data management client 104 and communicate with a web application server included in the data management server 102. The web application server may be any kind of web application server such as Internet Information Services (IIS) executing Active Server Pages, Apache Tomcat Java Servlet engine, etc. In other examples, the data management client 104 may be a thick client instead of a thin web client. In still other applications, the data management client 104 may be terminal and the data management server 102 may include a terminal server.

The data management server 102 may include a memory storage device 110 and a processor 112. The processor 112 may be any device or system capable of performing logic operations, analog or digital. The memory storage device 110 may be any kind of memory storage device or a combination of different kinds of memory or memory storage devices including, but not limited to, random access memory (RAM), read-only memory (ROM), hard disk, optical disk, digital video disk (DVD), compact disk read-only memory (CD-ROM), etc. The processor 112 may be in communication with the memory storage device 110. The memory storage device 110 may include computer code 114 that is executable with the processor 112. The computer code 114 may be any instructions written in any computer language or combination of computer languages, such as Java, C++, C#, C, Visual Basic, Java Script, Perl, assembly language, machine language, etc.

In some examples, the data management server 102 may also include a network interface 116, a display 118, and a selection device 119. The network interface 116 may be electrically connected to the processor 112 and to the network 108. The display 118 may be electrically connected to the processor 112 and may be any electro-optical device for display data, such as a liquid crystal display (LCD), a cathode ray tube (CRT) display, an electro-luminescent display, a plasma display panel (PDP), a vacuum florescent display (VFD), etc. The selection device 119 may be any user input device such as a mouse, touchpad, microphone, keyboard, or any other mechanism and/or systems that provide a communication path to exchange data between users and systems.

The database 106 may be any electronic collection of information that is organized so that the information may be accessed, managed, and updated, such as a Relational Database Management System (RDBMS), an object-oriented database, an extensible markup language (XML) database, a file system, memory structures, etc. The database 106 may include database entries. A database entry is information that may be retrieved from the database 106 using a unique key, such as a primary key value, a full path name, or an XML Path Language (XPATH) expression. The database entry may be stored across multiple locations in the database 106, such as across multiple tables in an RDBMS. A table in an RDBMS may include one or more columns.

Additionally, one or more database entries may be associated in the database 106 with one or more other database entries. Any method of associating database entries in a database, now known or later discovered, may be used. In some examples, a first database entry is associated with a second database entry by including a unique key in the second database entry to identify the first database entry. In other examples, the first database entry is associated with the second database entry by including a unique key in the first database entry to identify the second database entry. In still other examples, an association database entry includes a unique key to indentify the first database entry and a unique key to identify the second database entry.

The computer code 114 may be executable to send database entries to the database 106 and to receive database entries from the database 106. The database 106 may include different kinds of database entries, such as financial codes 120, financial data entries 122, related data entries 124, variance comments 126, sign-off data entries 128, business unit database entries 130, and data categories 132. The database 106 may include fewer or greater kinds of database entries.

Each of the financial codes 120 represents financial data to collect and manage. Table 1 describes columns in an example database table used to store financial codes 120 in the database 106. Other examples of tables used to store financial codes 120 may have fewer or greater number of columns.

TABLE 1

| Column Name | Description |
|---|---|
| Item_code | Stores a financial code identifier to identify this financial code |
| Item_description | Describes the financial data associated with this financial code |
| Summary_code | Identifies a summary accounting code under which entries associated with this financial code should be accounted |
| Code_type | Identifies the type of summary accounting code identified by the summary_code |
| Data_sign | Identifies whether a value of a financial data entry associated with this financial code should be treated as a positive or negative value when adding to other values of other financial data entries associated with this financial code |
| Data_type | Identifies the units of data associated with this financial code, such as units of currency, head count, or other kinds of units |
| Value_type | Identifies the type of financial data associated with this financial code, such as year-to-date, future value, quarterly, etc. |
| Category_code | Identifies a data category of financial data entries associated with this financial code |
| Sub_category | Identifies a subcategory of the data category of financial data entries associated with this financial code |
| Data_source | Indicates type of business entity responsible for providing financial data entries associated with this financial code such as business unit, group company, a support function, a service provider, etc. |
| Segment | Identifies a business segment to which financial data entries associated with this financial code apply |
| Item_comments | Comments to explain, clarify, or provide instructions for some aspect of this financial code |
| Control_xref | Permits a cross reference to control documents to support compliance with the Sarbanes-Oxley Act. |
| group_status | Indicates whether a group company or legal entity encompassing a business unit may be tracked in financial data entries corresponding to this financial code |
| Trading_partner_codes | Indicates that trading partners related to each financial data entry associated with this financial code may be tracked. |
| Recid | Primary key for this financial code |

The computer code 114 is executable to receive financial data entries 122 that correspond to the financial codes 120 stored in the database 106. A user, such as an administrator, may configure the financial codes 120 stored in the database 106 and thereby configure the data management system 100 to receive corresponding financial data entries 122.

The computer code 114 may receive data, such as the financial data entries 122, from multiple sources. The data may be received using any method of obtaining electronic data using computer code, now known or later discovered, or any combination of such methods. For example, the computer code 114 may receive the data from excel spreadsheets. In another example, the data may be received from a graphical user interface that obtains manual entry of the data from the user. In still another example, the computer code 114 may receive the data over the network 108 using SOAP.

A financial code 120 may be applicable to different levels of a business. A business may be divided into business units. In other examples, the business may be further subdivided into group companies that make up an enterprise, where each of the group companies includes business units. Each of these divisions of the business, such as business units and group companies, represent different levels of the business. A business may be divided into any number of levels. Where a financial code 120 represents financial data that is applicable to a level of the business other than, or in addition to, the enterprise level, more than one financial data entry 122 may be associated with the financial code 122 in the database 106.

For example, if the financial code 120 is applicable to each business unit, then the computer code 114 may receive a financial data entry 122 corresponding to the financial code 120 for each of the business units. In another example, if the financial code 120 is applicable to a different level of the business, such as applicable to a group company, then the computer code 114 may receive a financial data entry 122 for each instance of that level of the business and associate the financial data entries 122 with the financial code 120. The group company may be a corporate subsidiary or some other legal entity. If the financial code 120 is applicable only to the enterprise, then the computer code 114 may receive one financial data entry 122 for the financial code 120.

The data_source column in the example database table shown in Table 1 may indicate a data source type. The data source type may indicate a type of business entity responsible for providing financial data entries 122 associated with the financial code 120. A business entity may be configured to be, among others, a business unit, a group company, a support function, a service provider type, etc. The type of business entity may correspondingly be, among others, a business unit type, a group company type, a support function type, a service provider type, etc. An agent of a business entity may provide the financial data entries 122 by uploading or entering the financial data entries 122 into the data management system 100. Alternatively, or in addition, a business entity may be said to provide the financial data entries 122 by being the source of the information included in the financial data entries 122, but no agent of the business entity uploads or enters the financial data entries 122. In some examples, if the business entity of the business entity type is a level of the business that includes lower levels of the business, the computer code 114 may receive a financial data entry 122 corresponding to the financial code 120 for each of the lower levels of the business.

The item_code column in the example database table shown in Table 1 may store a financial code identifier to indentify this financial code 120. Any type of financial code identifier may be used, such as numeric, alphanumeric, etc. A financial code identifier may correspond to an accounting code. The item_description column in the example database table shown in Table 1 may be a textual description of the type of financial data associated with the financial code 120.

The summary_code column in the example database table shown in Table 1 may identify a summary accounting code under which financial data entries 122 associated with this financial code 120 may be aggregated. More than one financial code 120 may share the same summary accounting code where associated financial data entries 122 may be aggregated under the same summary accounting code. Thus, if a user creates multiple financial codes 120 that share the same summary accounting code, the data management system 100 may be configured to collect and manage data at a lower level of granularity than may be tracked in a financial system that has only one entry for the summary accounting code.

The code_type column in the example database table shown in Table 1 may identify the type of summary accounting code indicated in the summary_code column. The code_type column may be used if more data segregation is desired than the summary accounting code provides. In one example, different summary account codes may be of the same type. The computer code 114 may generate reports keyed off of the type of summary accounting code.

Because the data management system 100 may manage any type of financial data, including data that is not typically managed in other systems, it may be unclear to the user whether a value included in a financial data entry 122 associated with the financial code 120 should be treated as a positive or negative value when adding to other values included in other financial data entries 122 associated with the financial code 120. Consequently, the data_sign column in the example database table shown in Table 1 may identify whether the value of the financial data entry 122 associated with this financial code 120 should be treated as a positive or negative value.

The data_type column in the example database table shown in Table 1 may identify the data type, i.e., units of data, associated with this financial code 120, such as units of currency, head count, or any other desired unit of data. Because the units of data are configurable, the computer code 114 may be configured to receive different types of data. Also, if certain units of data are preferred, such as thousands of dollars instead of dollars, the units of data may indicate preferred units of data.

In contrast to systems tracking financial data in existing systems, the data management system 100 may manage future values. The value_type column in the example database table shown in Table 1 may identify the type of the value included in a financial data entry 122 associated with the financial code 120, such as year-to-date, quarterly, a current balance, a "remainder of the year" value, a future value, etc.

The control_xref column in the example database table shown in Table 1 may permit a cross reference to control documents in order to support compliance with the Sarbanes-Oxley Act. A control document may include descriptions of procedures, policies, risk areas, controls, objectives, etc. that are related to this financial code 120.

The group status column in the example database table shown in Table 1 may indicate whether a group company or legal entity encompassing the business unit may be tracked in the financial data entries 122 corresponding to the financial code 120. The Trading_partner_codes column in the example database table shown in Table 1 may indicate that a trading partner giving rise to a financial data entry 122 associated with the financial code 120 may be included in the financial data entry 122.

The category_code column in the example database table shown in Table 1 may identify the data category 132 associated with the financial code 120. The data categories 132 may be stored in the database 106. The data management system 100 may be configured to permit different workflows based on the data category 132. In other words, each of the data categories 132 stored in the database 106 corresponds to a category of data that shares a common workflow within the data management system 100. Data categories 132 may be predetermined or determined dynamically. For example, one data category may correspond to financial data that is loaded into the database 106 from a general ledger. Another data category may correspond to data that is entered at the business unit level. Yet another data category may correspond to data that is centrally entered for the business. Still another data category may correspond to data that is loaded into the database 106, but that does not apply to any user of the data management system 100. However, these are merely illustrative examples—data categories may be determined for any given installation of the data management system 100 to satisfy the needs of the users at that installation. Each data category 132 may have a unique set of input and sign-off deadlines. Additionally, each data category 132 may have category specific reports. Consequently, data that may require a different input or sign-off deadline may be assigned to a unique data category 132.

The sub_category column in the example database table shown in Table 1 may identify a subcategory of data associated with this financial code 120. The data management system 100 may be configured to permit different workflows based on the subcategory. For example, the computer coded 114 may generate reports based on the subcategory. The subcategory may be identified with an alphanumeric string in some examples. Each subcategory may be configured in the database 106.

The segment column in the example database table shown in Table 1 may identify a business segment to which data associated with the financial code 120 applies, such as business, finance, tax, corporate, etc. Multiple business units may be involved in the same business segment, and financial data entries 122 associated with the financial code 120 may be applicable only to business units in a particular business segment. By associating the particular business segment with the financial code 120, the computer code 114 may receive a financial data entry 122 corresponding to the financial code 120 for each of the business units in the particular business segment. Additionally or alternatively, the business segment may be used for reporting purposes.

The item_comments column in the example database table shown in Table 1 may store comments about the financial code 120 that may be used to explain, clarify, or provide instructions for some aspect of the financial code 120.

In some examples, the financial code 120 may also have an associated status. The status may be active, inactive, or some other status. If the financial code 120 has a status of a determined value of inactive, then the computer code 114 may be configured not to receive financial data entries 122 corresponding to the financial code 120. However, financial data entries 122 that correspond to the financial code 120 that were received prior to the financial code 120 becoming inactive and that were stored in the database 106 may remain. A user, such as an administrator, may direct the computer code 114 to selectively remove such financial data entries 122 from the database 106.

As discussed above, the financial codes 120 stored in the database 106 may configure the computer code 114 to receive the financial data entries 106. Each of the financial data entries 122 included in the database 106 include financial data associated with a financial code 120. Table 2 describes columns in an example database table used to store financial data entries 122 in the database 106. Other examples of tables used to store financial data entries 122 may have fewer or greater number of columns.

TABLE 2

| Column Name | Description |
|---|---|
| Item_code | Identifies the financial code associated with this financial data entry |
| BU | Business unit to which this financial data entry applies |
| Period | Identifies a financial period to which this financial data entry applies |
| Category | Identifies a data category of this financial data entry |
| Amount | A value having a datatype indicated by the financial code associated with this financial data entry |
| Tradingpartner | The name of another party involved in financial data entry business transaction giving rise to this financial data |
| Audit_information | Indicates the user who entered this financial data entry and the time that the financial data entry was made. |
| Itemid | Primary key for this financial data. |

The item_code column in the example database table shown in Table 2 may indicate the financial code 120 associated with the financial data entry 122. The BU column in the example database table shown in Table 2 may indicate a business unit to which the financial data entry 122 applies. In some examples, the BU column may not be set if the financial data entry 122 is only reported at an enterprise level and not at a business unit level.

The period column in the example database table shown in Table 2 may indicate a financial period to which the financial data entry 122 applies, such as a financial quarter. The category column in the example database table shown in Table 2 may indicate the data category 132 of the financial data entry 122.

The amount column in the example database table shown in Table 2 may store a numerical value that has a data type indicated by the financial code 120 associated with the financial data entry 122. The trading partner column in the example database table shown in Table 2 may indicate the name of another party involved in a business transaction giving rise to the value included in the financial data entry 122.

The audit_information column in the example database table shown in Table 2 may associate audit information with the financial data entry 122. The audit information may include a username of a user that made the financial data entry 122. The audit information may also include a timestamp that indicates when the user made the financial data entry 122. The audit information may also include the username and timestamp corresponding to each of the times the financial data entry 122 was updated, to the last time the financial data entry 122 was updated, to the first time the financial data entry 122 was entered, etc.

In addition to storing the financial data entry 122 in the database 106, the computer code 114 may also store related data in related data entries 124 in the database 106. Each of the related data entries 124 included in the database 106 include data related to an associated financial data entry 122. For example, the related data entries 124 may include data such as electronic copies of one or more contracts giving rise to the associated financial data entry 122. In other examples, no related data entries 124 may be included in the database 106. In still other examples, data related to financial data may be stored in the financial data entry 122 instead of in the related data entry 124.

During operation of the data management system 100, the computer code 114 may calculate a variance value from a value included in the financial data entry 122 and from values included in past financial data entries 122. The past financial data entries 122 may be financial data entries 122 corresponding to the financial data entry 122—i.e., having the same attributes of the financial data entry 122—but that are applicable to past financial periods instead of a current financial period. Any formula may be used to calculate the variance value, such as differences based on total values or periodic average values. The computer code 114 may be configured to calculate the variance value based on the data category 132 of the financial code 120 associated with the financial data entry 122. The choice of the formula to calculate the variance value may be based on the purpose of the financial code 120. The choice of the formula may additionally or alternatively be based on the type of the value of the financial code 120 associated with the financial data entry 122, such as is indicated by the value_type column in the example database table shown in Table 1.

The computer code 114 may be configured to determine which financial periods should be used to calculate the variance value. In some examples, the computer code 114 may be configured to use different financial periods depending on the data category 132 of the financial data entry 122. For example, the computer code 114 may calculate the variance value using a trend established over the past 4 periods to calculate variances against the prior period and the same period from the prior year. In other examples, the computer code 114 may calculate the variance value using a trend established over the past 6 periods.

The computer code 114 may be configured to identify all past financial periods in the data management system 100. In other examples, the computer code 114 may be configured to select from identified financial periods when configuring which financial periods are to be used to calculate the variance value.

Furthermore, the computer code 114 may be configured to require receipt of an explanatory comment in addition to the financial data entry 122 when the variance value exceeds a determined value. The determined value may be based on a percentage of an average of values of corresponding financial data entries 122 applicable to past financial periods. The determined value may be based on any formula desired by a user and may even depend on an attribute of the financial data entry 122, such as an associated data category 132. An entry of a comment may also be required based on variance calculations that are both value and percentage based. In alternative examples, the variance value may be calculated and may exceed a determined value and/or percentage, but the computer code 114 may not require receipt of the explanatory comment.

The explanatory comment may be stored in a variance comment 126 stored in the database 106. Table 3 describes columns in an example database table to store variance comments 126 in the database 106. Other examples of tables to store variance comments 126 may have fewer or greater number of columns.

TABLE 3

| Column Name | Description |
|---|---|
| Period | Identifies a financial period to which the associated financial data entry applies |
| BU | Business unit to which the associated financial data entry applies |
| Item_Code | Identifies the associated financial data entry to which this comment applies |
| Comment | Stores explanatory text of the variance comment or any other comment |
| Audit_information | Indicates the user who entered this variance comment and the time that variance comment was made |
| Recid | Primary key for this comment |

The item_code column in the example database table shown in Table 3 may identify the associated financial data entry 122 to which the variance comment 126 applies. The period column in the example database table shown in Table 3 may identify the financial period to which the associated financial data entry 122 applies. The BU column in the example database table shown in Table 3 may identify the business unit to which the associated financial data entry 122 applies. In some examples, if the associated financial data entry 122 is only reported at a level other than the business unit level, the BU column may not be set. In other examples, the BU column may be set for each of the business units included in the enterprise, regardless of reporting level.

The comment column in the example database table shown in Table 3 may store the explanatory text of the variance comment 126. In other examples, the comment column may store text of any comment not related to variances.

The audit_information column in the example database table shown in Table 3 may associate audit information with the variance comment 126, because updating the explanatory text in the variance comment 126 may be done at a different time by a different user than the financial data entry 122. In other examples, the audit information may be the same for both the variance comment 126 and the financial data entry 122. In still other examples, no audit information may be stored in the database 106.

After financial data entries 122 and/or related data entries 124 are received into the data management system 100, individuals with the appropriate authority may need to sign off on the received data that is applicable to a financial period. For example, a business may designate an individual to review and sign off on the received data applicable to each business unit. The individual may be different for different business units. In some examples, a different individual may have signing authority for a group company and that individual may need to review and sign off on the received data applicable to the group company. Yet another individual may need to review and sign off on the received data that is applicable to the enterprise.

Each of the sign-off data entries 128 stored in the database 106 may store sign-off information relating to a sign-off on one or more financial data entries 122. Table 4 describes columns in an example database table used to store sign-off data entries 128 in the database 106. Other examples of tables used to store sign-off data entries 128 may have fewer or greater number of columns.

TABLE 4

| Column Name | Description |
|---|---|
| Period | Identifies a financial period to which the sign-off data entry applies |
| BU | Identifies a Business Unit to which the sign-off data entry applies |
| Subcategory | Optionally identifies a subcategory of financial data entries associated with the identified business unit that was signed off on if only the subcategory of financial data was signed off on |
| Comments | Comments enterable by a user performing the sign-off |
| Signature | An electronic signature |
| Status | Identifies the status of the data applicable to the identified business unit and potentially to the identified subcategory of such data |
| addsupcode | Optionally identifies a financial code to which the sign-off data entry applies |
| Audit_information | Indicates the user who performed the signed-off and the time that the sign-off was made |
| Recid | Primary key for this sign-off date entry |

The period column in the example database table shown in Table 4 may identify a financial period to which the sign-off data entry 128 applies. The BU column in the example database table shown in Table 4 may identify a business unit to which the sign-off data entry 128 applies. Sign-off of a business unit may represent a sign-off on all financial data entries 122 applicable to the business unit.

The subcategory column in the example database table shown in Table 4 may identify a subcategory of financial data entries 122 associated with the identified business unit. If a subcategory is identified in the sign-off data entry 128, then the sign-off data entry 128 may represent a sign-off on only those financial data entries 122 that are associated with the identified business unit and that belong to the subcategory.

In other examples, the sign-off data entry 128 may represent a sign-off on only those financial data entries 122 that are of a particular data category 132 and that are applicable to a particular financial period. In still other examples, the sign-off data entry 128 may represent a sign-off on only one financial data entry.

The status column in the example database table shown in Table 4 may identify the status of the sign-off on the financial data entries 122 applicable to the identified business unit, subcategory, and/or financial code 120 of the financial data entries 122. For example, the status may be "approved," "rejected," "under review," etc. In some examples, if the status is any value other than "approved," an explanatory comment may be required. In other examples, if the status is any value other than "approved," then an explanatory comment may not be required.

The signature column in the example database table shown in Table 4 may include an electronic signature provided by the user when the user signed off on the received data. The electronic signature may be any electronic data that carries the intent of a signature, such as a digital signature. For example, a digital signature may be a common type of asymmetric cryptography used to simulate the security properties of a handwritten signature on paper. Alternatively or in addition, the electronic signature may be in the form of a text entry such as a name, a name entered between forward slash characters ("/"), etc.

The comments column in the example database table shown in Table 4 may include comments made by the user performing the sign-off represented by the sign-off data entry 128. The comments may, for example, provide a reason for the user rejecting data applicable to the sign-off data entry 128. In other examples, the comments may include reasons for signing off on data containing a variance value exceeding a determined value.

The addsupcode column in the example database table shown in Table 4 may optionally identify the financial code 120 to which the sign-off data entry 128 applies. For example, the user may perform the sign-off represented by the sign-off data entry 128 on all financial data entries 122 associated with the financial code 120 identified in the addsupcode column. In another example, the user may perform the sign-off represented by the sign-off data entry 128 on all financial data entries 122 associated with a particular business unit and the financial code 120 included in the addsupcode column.

Each of the business unit database entries 130 stored in the database 106 may correspond to a business unit of a company. Table 5 describes columns in an example database table used to store business unit database entries 130 in the database 106. Other examples of tables used to store business unit database entries 130 may have fewer or greater number of columns.

TABLE 5

| Column Name | Description |
|---|---|
| name | Name of this business unit |
| code | A user-defined code that identifies this business unit |
| Signoff_level | Optionally set to a common value for each business unit in a set of business units grouped together for a single point of sign-off |
| controller | Identifies a user who is a financial controller responsible for this business unit |
| Group_company | Optionally identifies a corporate subsidiary company or legal entity that includes this business unit |
| segment | Optionally identifies a business segment in which this business unit is engaged |
| sortie | Number identifying sort order of this business unit with respect to other business units |
| recid | Primary key |

The name column in the example database table shown in Table 5 may be a name of the business unit. The code column in the example database table shown in Table 5 may be a user-defined code that identifies the business unit. For example, the user-defined code may be an alphanumeric code, a numeric code, a symbol, etc.

The Signoff_level column in the example database table shown in Table 5 may optionally be set to a common value for each of the business units in a set of business units grouped together for a single point of sign-off. For example, the financial data entries 122 applicable to the business units included in the set may be signed off on with one sign-off data entry 128.

The controller column in the example database table shown in Table 5 may identify a user who is a financial controller responsible for the business unit. The Group_company column in the example database table shown in Table 5 may optionally identify a corporate subsidiary or other legal entity that includes this business unit.

The segment column in the example database table shown in Table 5 may optionally identify a business segment in which this business unit is engaged. For example, the business segments may be identified where multiple types of businesses are included in a company's financial reporting process.

The sortie column in the example database table shown in Table 5 may include a number identifying a sort order of this business unit with respect to other business units. By assigning each of the business units with a number and sorting based on the number, the order in which the business units are displayed may be determined by the number.

The data management system 100 may use security code to restrict access to certain features of the data management system 100. For example, role-based security may be used. Individual security privileges may be individually granted to users instead of using role-based security. The roles may include roles such as a site administrator role, a data entry role, a data view role, and a sign-off role.

The data management system 100 may permit access to certain features only by authorized users. For example, a user granted the site administrator role may have access to all features of the data management system 100. The data entry role, the data view role, and the sign-off role may be specific to a particular business level, such as business unit. A user granted the data entry role may have access to view data applicable to the particular business level. A user with the data entry role may have access to enter data applicable to the particular business level. A user with the sign-off role may be able to sign off on data applicable to the particular business level. As an example, a financial controller responsible for a business unit might be granted the data entry role and the sign-off role for the business unit. These examples are merely meant to be illustrative examples and are not to be construed to limit the number of roles, the types of privileges, the security mechanisms, or the features having controlled access.

In addition to controlling access to features using the security layer, control over data management in the data management system 100 may be configured by permitting certain actions to occur only within certain time periods. For example, a user may configure a time period during which the computer code 114 may receive financial data entries 122 and/or related data entries 124 for a given financial period. The time period may be stored in the database 106. In another example, the user may configure a time period during which the computer code 114 may permit sign-off on data. In still another example, the user may grant an extension to the time period. The time period for a certain action and/or for a certain extension may be specific to a level of the business, such as specific to a business unit. The time period and/or the extension may also be specific to a particular data category 132 of financial data entries 122 and related data entries 124.

A time period may include an end date, or the time period may include a start date and an end date, i.e., an "open date" and a "close date." A date may include a day, or both a day and a time.

In addition to providing control over data management, the data management system 100 may also include notification features to communicate data management related information to users. For example, the computer code 114 may be configurable to create a user notification directed to users of the system. The user notification may include a message deliverable to the users. The computer code 114 may be further configurable to create a user notification directed to a subset of the users of the system, such as to users granted security roles applicable to a particular business unit. In one example, the user to whom the user notification was directed may view the message when that user logs into the data management system 100. In another example, the computer code 114 may e-mail the user notification to that user. In yet another example, any now known or later discovered method of delivering notifications, or any combination thereof, may be used.

The computer code 114 may also generate user notifications in response to certain events. For example, an alert may be generated when a close date is approaching, when data is signed off on, when all financial data entries 122 for a business unit applicable for a financial period have been received by the computer code 114, etc.

Figure 2:
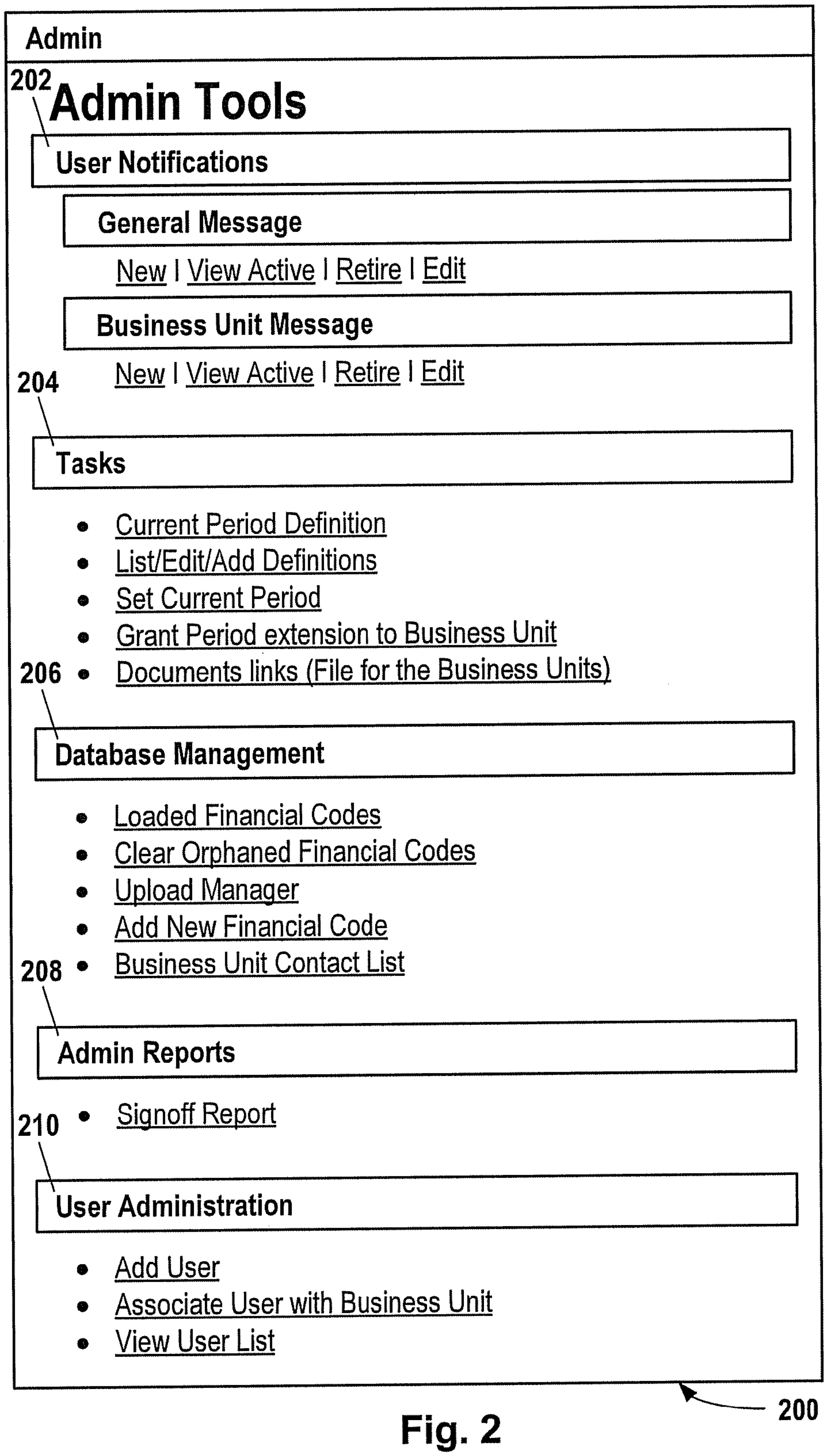
FIG. 2 is an example of a graphical user interface generated by the computer code of FIG. 1.

FIG. 2 is an example of a graphical user interface (GUI) 200 generated by the computer code 114 of FIG. 1. The example GUI 200 displays links related to administration of the data management system 100 described in FIG. 1. The example GUI 200 includes links to administer user notifications 202, to tasks related to deadline management 204, database management functions 206, administrative reports 208, and security administration 210. Other examples GUIs may display fewer or greater number of links and may provide more or less functionality. The computer code 114 may generate the example GUI 200 for a user granted the site administrator role. In one example, other users may not see any links to administration functionality. A link may be any user input control that is selectable with the selection device 119 of FIG. 1. For example, a link may be a hyperlink, a button, a tab, etc.

FIG. 3 is an example of a GUI 300 generated by the computer code 114 of FIG. 1 to view financial codes 120. A user such as an administrator may use the GUI 300 of FIG. 3 to administer financial codes 120. In this example, summary codes 302 are displayed and if one of the summary codes 302 is selected, the computer code 114 may display a list of financial codes 120 that are associated with the selected one of the summary codes 302. In this example, the summary codes 302 are displayed in a column under a data category 132, where each of the summary codes 302 in the column is associated with the data category 132.

FIG. 4 is an example of a GUI 400 generated by the computer code 114 of FIG. 1 to view the financial codes 120 associated with a previously selected summary code 302 associated with the data category 132. In this example, a financial code identifier 402 for each of the displayed financial codes 120 is displayed along with other attributes of each of the financial codes 120. In this example, the user may select the financial code identifier 402, and the computer code 114 may generate a different GUI, such as the GUI illustrated in FIG. 5, to edit the financial code 120 identified by the financial code identifier 402.

FIG. 5 is an example of a GUI 500 generated by the computer code 114 of FIG. 1 to edit or create the financial code 120. The computer code 114 may display various attributes of the financial code 120 and display user input controls selectable with the selection device 119 to modify the various attributes.

Figure 6:
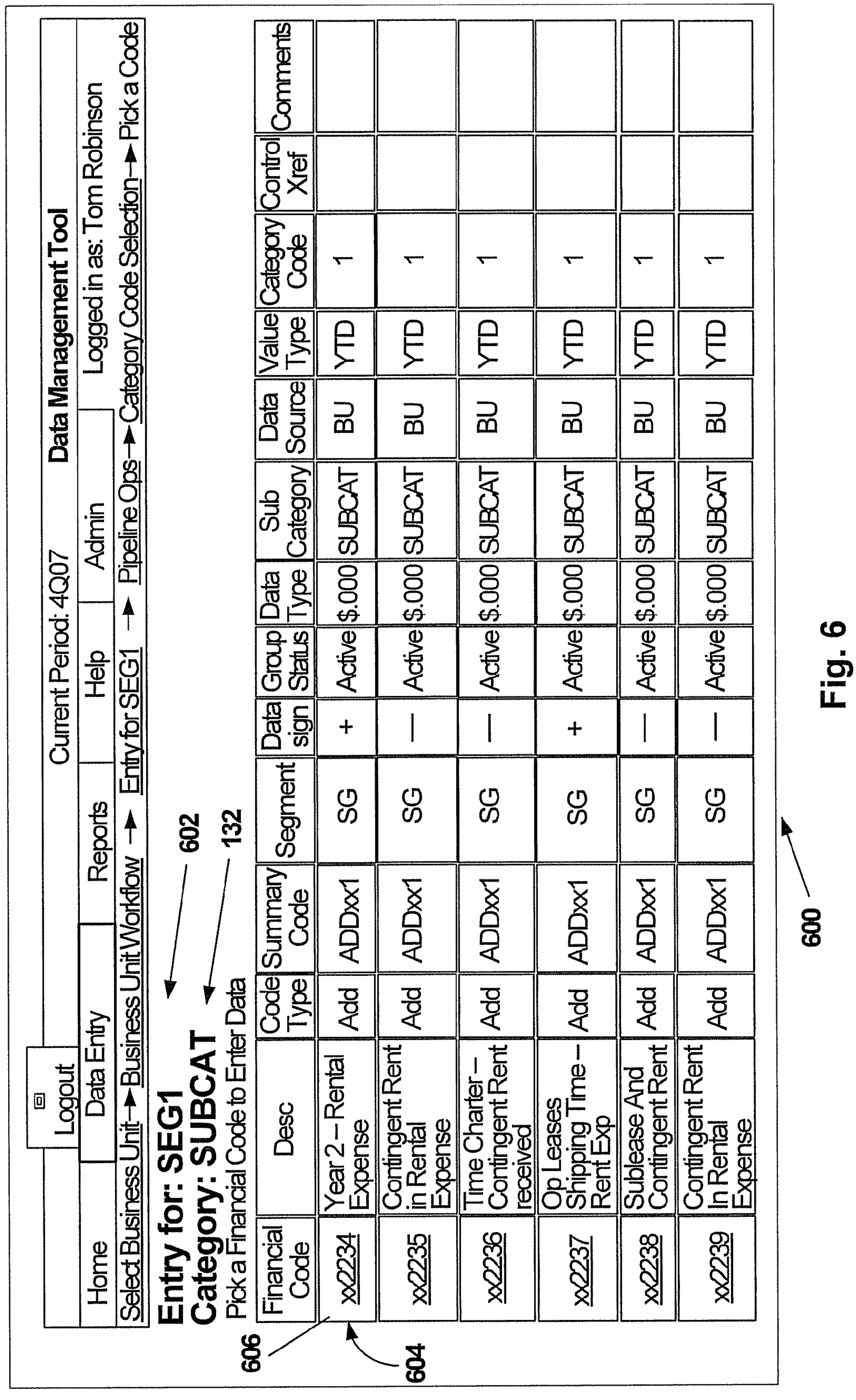
FIG. 6 is an example of a graphical user interface generated by the computer code of FIG. 1 to receive manual entry of financial data entries.

FIG. 6 is an example of a GUI 600 generated by the computer code 114 of FIG. 1 to receive manual entry of the financial data entries 122. In this example, the GUI 600 may be generated after the user selected the business unit 602 and the data category 132. The computer code 114 may display a list of desired user entries 604 corresponding to financial codes 120 applicable to the selected business unit 602 and of the selected data category 132. A desired user entry 604 may correspond to the financial data entry 122 associated with the financial codes 120 applicable to the business unit 602 and to the current financial period, and associated with the data category 132, but where the financial data entry 122 does not yet include a value. For each of the desired user entries 604, the computer code 114 may display a financial code identifier 606 that identifies the financial code 120. The computer code 114 may also display attributes of each of the financial codes 120 other than the financial code identifier 606.

In other examples, the desired user entries 604 may correspond to the financial data entries 122 associated with the financial codes 120 applicable to the selected business unit 602 and to the current financial period and associated with the data category 132. The computer code 114 may display an indication for each of the desired user entries 604, whether the financial data entry 122 includes a value.

In this example, the user may select the financial code identifier 606 and, in response, the computer code 114 may display a GUI such as the one in FIG. 7 to receive a manual entry of the value to be included in the corresponding financial data entry 122.

FIG. 7 is an example of a GUI 700 generated by the computer code 114 of FIG. 1 to receive a manual entry of the value to be included in a selected financial data entry 122. The computer code 114 may display a financial code identifier 702 that identifies the corresponding financial code 120. The computer code 114 may also display attributes 704 of the corresponding financial code 120 other than, or in addition to, the financial code identifier 702. For example, the computer code 114 may also display a description 704 of the corresponding financial code 120.

The computer code 114 may display an amount user input control 706 to receive input of the value of the financial data entry 122. In some examples, the computer code 114 may display a comment user input control 708 operable to input a comment text to be associated with the financial data entry 122 in the database 106. If the user selects a submit user input control 710, the computer code 114 may receive data inputted into the amount user input control 706 and the comment user input control 708 and store the data and/or the comment in the financial data entry 122 and/or a variance comment 126.

In some examples, the computer code 114 may display prior period values 712 of corresponding financial data entries 122 from prior financial periods. If the value received from the amount user input control 706 exceeds the variance value by the determined amount as discussed earlier, the computer code 114 may display a GUI such as the one in FIG. 8 to enter the explanatory text.

FIG. 8 is an example of a GUI 800 generated by the computer code 114 of FIG. 1 to enter text to explain the variance value having exceeded the determined value. In one example, the computer code 114 displays the GUI 800, which may be similar to the GUI 700 of FIG. 7, but which additionally displays a message 802 that indicates a comment is required due to the variance value exceeding the determined value. In another example, the computer code 114 also displays information 804 on the variance value and on calculation thereof.

In addition to receiving and controlling receipt of data, the data management system 100 of FIG. 1 also may generate reports from data entries stored the database 106. In one example, a subset of the reports may be accessible only to users granted a particular security role. The reports that show data derived from data applicable to one level of the business may be accessible only to those users that are authorized to view data applicable to that level of the business.

In one example of the data management system 100, each report may be downloaded in a spreadsheet format, such as Microsoft Excel format. In another example, only select reports may be downloaded in the spreadsheet format. In yet another example, no reports may be downloaded in a spreadsheet format. In still another example, at least one report is downloadable in a spreadsheet format that is in the same spreadsheet format in which the computer code 114 receives data, including, for example, financial data entries 122. As one such example, a spreadsheet downloaded from the system 100 may include multiple rows, where each row corresponds to a desired user entry. A user may then enter data into the spreadsheet. The computer code 114 may subsequently receive the downloaded spreadsheet, through a GUI for example, and create or update corresponding financial data entries 122 in the database 106.

The computer code 114 may generate consolidated reports, such as a report of the total of all of the values of the financial data entries 122 applicable to a business unit for each of the business units. To calculate the total of all of the values of the financial data entries 122 in such a report, the computer code 114 may add each value of each financial data entry 122 applicable to the business unit to the next using the data sign of each financial data entry 122. Columns in such a report may include, for example: business unit code, business unit name, amount, financial period, etc. A similar report may include totals for each of the trading partners instead for each of the business units.

Another example of a consolidated report may be a report of totals for certain data elements, such as for data categories 132, subcategories, financial codes 120, etc., which may be used in a management or consolidated review of data stored in the database 106. Columns in such a report for data categories 132 may include, for example: data category name, amount, financial period, etc. Columns in such a report for financial codes 120 may include, for example: financial code identifier, amount, financial period, trading partner name, etc.

Yet another example of a consolidated report may be a report of totals by sign-off status to monitor the approval process and to ensure that those users authorized to enter, sign off on, or document data entries do so within established deadlines. An additional example of a consolidated report may be a report with comparative variances to ensure that controls over the data validation are completed.

Still another example of a consolidated report may be a snapshot report. The snapshot report may provide a snapshot of data entered applicable to a business unit for the current financial period. Columns in such a report may include, for example: business unit code, business unit name, financial period, financial code identifier, amount, trading partner name, etc.

The computer code 114 may generate reports that permit a user to drill down to details of interest. For example, the computer code 114 may generate reports to analyze variances. The report may include a list of financial data entries 122 that have variance comments 126 associated with them. A user may select one of such financial data entries 122 and view the associated variance comment 126.

The computer code 114 may generate reports detailing audit information, such as a breakdown of consolidated data by business unit. Such a report may include columns such as, the name of the user who inputted data, the date of input, identifications of any adjustments made, and display of any related comments. Other example reports may be generated from collected audit information.

Figure 9:
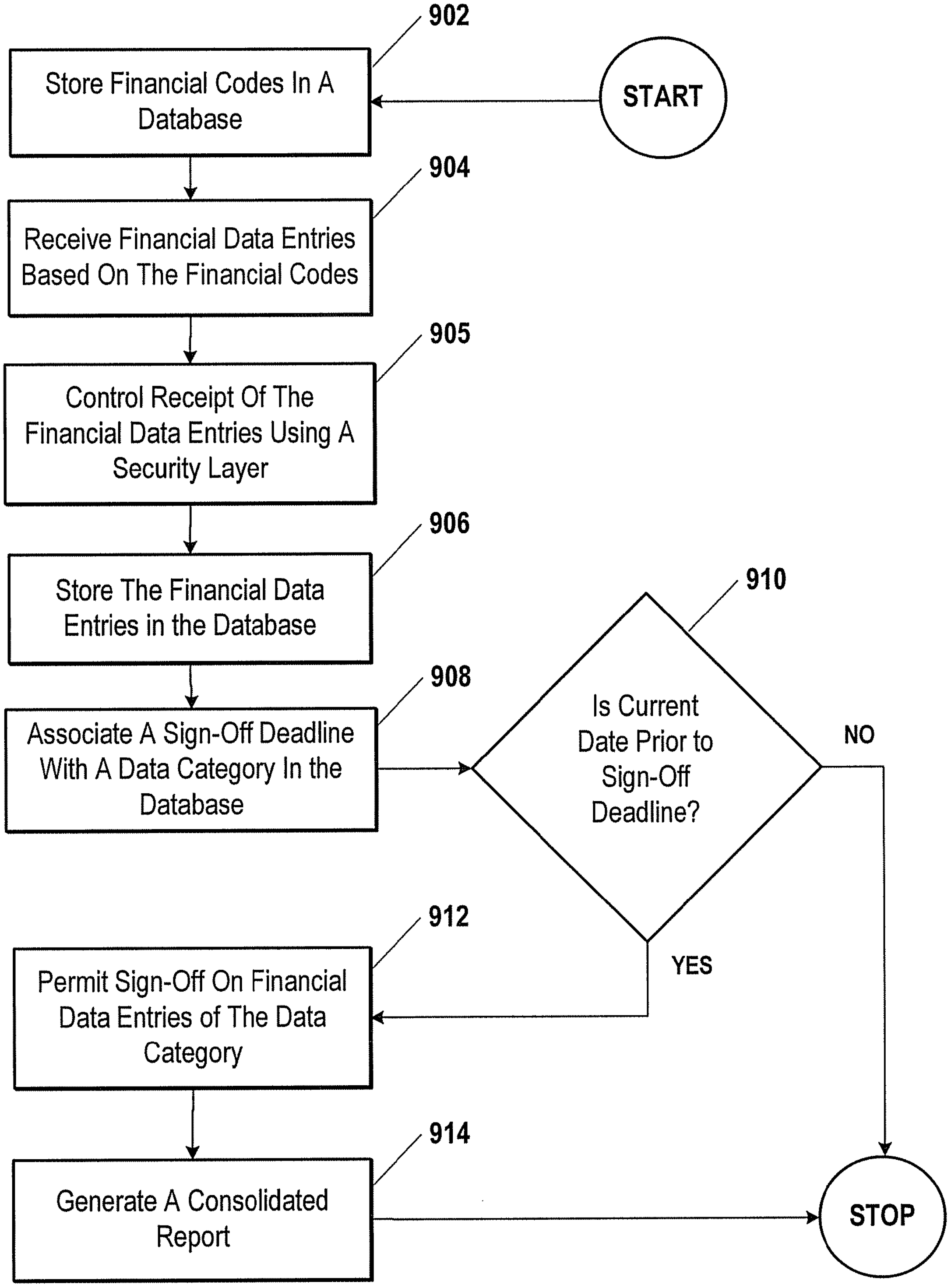
FIG. 9 is a flow diagram illustrating an example operation of the data management system of FIG. 1.

FIG. 9 is a flow diagram illustrating an example operation of the data management system 100 of FIG. 1. The operation may begin, at block 902, by storing financial codes 120 in the database 106. The operation may continue, at block 904, by receiving financial data entries 122 based on the financial codes 120 stored in the database 106. The financial codes 120 may include a financial code 120 and the financial data entries 122 may contain a financial data entry 122. The financial data entry 122 may be applicable to at least one business unit and may include financial data not tracked in a general ledger. The operation may further include, at block 905, controlling receipt of the financial data entries 122 using a security layer.

At block 906, the operation may continue by storing the financial data entries 122 in the database 106. The operation may continue, at block 908, by associating a sign-off deadline with a data category 132 in the database 106.

Continuing to block 910, the operation may include checking whether the current date is prior to the sign-off deadline. If not, the illustrated portion of the operation may be complete. Alternatively, if the current date is prior to the sign-off deadline, the operation may continue, at block 912, by permitting a user to sign-off on the financial data entries 122 that are associated with the data category 132. The illustrated portion of the operation may complete, at block 914, by generating a consolidated report from the financial data entries 122.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other machine-readable media, for example, secondary storage devices such as hard disks, floppy disks, and CD-ROMs; a signal received from a network; or other forms of ROM or RAM either currently known or later developed. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

We claim:

1. A data management system comprising:

a memory storage device; and a processor in communication with the memory storage device, the memory storage device comprising computer code stored therein, the computer code executable with the processor and comprising:

code executable to display a plurality of desired user entries, wherein each of the desired user entries corresponds to respective one of a plurality of financial codes;

code executable to receive a financial data entry corresponding to at least one of the desired user entries, wherein each of the financial codes corresponding to the at least one of the desired user entries includes a data source type indicative of a type of business entity responsible to provide the financial data entry;

code executable to associate a data category with a financial code, the financial code included in the financial codes;

code executable to associate a sign-off deadline with the data category;

code executable to permit access to financial data included in the financial data entry;

code executable to permit a sign-off of the financial data for a financial period only before the sign-off deadline on any financial data entries corresponding to the financial code;

code executable to display past financial data entries, wherein the financial data entry applies to a current financial period, the past financial data entries correspond to the financial data entry, and the past financial data entries apply to a plurality of financial periods prior to the current financial period; and code executable to calculate a variance value from the financial data entry and the past financial data entries.

2. The data management system of claim 1, wherein the type of business entity is a group company type.

3. The data management system of claim 1, wherein the variance value is calculated based on a data type of the financial data entry.

4. The data management system of claim 1, the computer code further comprising:

code executable, in response to the variance value determined to exceed a determined value, to require receipt of an explanatory comment in addition to the financial data entry.

5. The data management system of claim 1, the computer code further comprising code executable to generate a consolidated report from a plurality of financial data entries, the financial data entries including the financial data entry.

6. The data management system of claim 1, wherein the code executable to receive the financial data is further configured to accept the financial data entry only during a determined time period.

7. The data management system of claim 1, the computer code further comprising code executable to receive the financial data entry only from a user authorized to enter data applicable to a business unit, wherein the financial data entry is applicable to the business unit.

8. The data management system of claim 1, wherein the financial data entry is a first financial data entry, the computer code further comprises code executable to receive a second financial data entry corresponding to a desired user entry, the desired user entry included in the desired user entries, wherein the second financial data entry is tracked by the general ledger.

9. The data management system of claim 8, wherein each of the first financial data entry and the second financial data entry includes a different one of a plurality of data categories.

10. The data management system of claim 9, wherein the computer code is configured to use a different workflow to manage the first financial data entry than the second financial data entry based on each of the first financial data entry and the second financial data entry comprising different data categories.

11. The data management system of claim 1, the computer code further comprising code executable to generate a spreadsheet from a plurality of financial data entries, the financial data entries including the financial data entry, wherein the spreadsheet comprises a plurality of rows, and one of the rows corresponds to the financial data entry.

12. The data management system of claim 1, wherein the code executable to receive the financial data entry is executable to permit receipt only of financial data applicable to one financial period.

13. The data management system of claim 1, the computer code further comprising:

code executable to configure a time period to include an open date and a close date;

code executable to associate the time period with the data category in a database; and code executable to permit receipt of the financial data entry only during the time period based on the financial code corresponding to the financial data entry.

14. The data management system of claim 13, the computer code further comprising code executable to grant an extension of the close date, the extension applicable only to at least one business unit included in a plurality of business units.

15. The data management system of claim 1, the computer code further comprising code executable to configure units of data for each of the financial codes, wherein the code executable to receive the financial data entry includes code executable to receive a value included in the financial data entry in a unit of data, the unit of data configured for the one of the financial codes corresponding to the financial data entry.

16. The data management system of claim 1, the computer code further comprising:

code executable to receive a plurality of financial data entries, the financial data entry included in the financial data entries; and code executable to generate a consolidated report, wherein the consolidated report includes a total value corresponding to each respective one of a plurality of business units, wherein the total value is the sum of a value of each of the financial data entries applicable to each respective one of the business units, and the sign of the value is determined by a data sign of a respective one of the financial codes corresponding to the financial data entries.

17. A data management system comprising:

a display;

a user input device;

a memory storage device; and a processor in communication with the display, the user input device, and the memory storage device, the memory storage device comprising computer code stored therein, the computer code executable with the processor and comprising:

code executable to cause display of a plurality of desired user entries on the display, wherein each of the desired user entries corresponds to respective one of a plurality of financial codes, each one of the financial codes is indicative of a respective type of financial data desired for each respective one of the desired user entries;

code executable to receive, from the user input device, a financial data entry corresponding to at least one of the desired user entries, wherein each of the financial codes corresponding to the at least one of the desired user entries includes a data source type indicative of a type of business entity responsible to provide the financial data entry;

code executable to associate a data category with a financial code, the financial code included in the financial codes;

code executable to associate a sign-off deadline with the data category;

code executable to permit access to financial data included in the financial data entry;

code executable to permit a sign-off of the financial data for a financial period only before the sign-off deadline on any financial data entries corresponding to the financial code;

code executable to display past financial data entries, wherein the financial data entry applies to a current financial period, the past financial data entries correspond to the financial data entry, and each of the past financial data entries apply to a respective one of a plurality of financial periods prior to the current financial period; and code executable to calculate a variance value from the financial data entry and the past financial data entries.

18. The data management system of claim 17, the financial data desired for each respective one of the desired user entries consisting of at least one of an on-going contractual commitment, head count for a business entity, an environmental incident, lost time for the business entity, or a disposal of operations.

19. The data management system of claim 17, the computer code further comprising code executable to grant an extension of the close date, the extension applicable only to at least one business unit included in a plurality of business units, a business entity comprising the business units.

20. The data management system of claim 17, the computer code further comprising:

code executable, in response to the variance value determined to exceed a threshold value, to require receipt of an explanatory comment in addition to the financial data entry, wherein the variance value indicates how different the financial data entry is from the past financial data entries, and the current financial period and the financial periods prior to the current financial period are accounting divisions of at least one accounting year.

21. The data management system of claim 1, wherein financial data of each of the desired user entries is not tracked in a general ledger.

22. The data management system of claim 17, wherein the financial data of each of the desired user entries is not tracked in a general ledger.

23. A method for data management comprising:

displaying a plurality of desired user entries, wherein each of the desired user entries corresponds to respective one of a plurality of financial codes;

receiving a financial data entry corresponding to at least one of the desired user entries, wherein each of the financial codes corresponding to the at least one of the desired user entries includes a data source type indicative of a type of business entity responsible to provide the financial data entry;

associating a data category with a financial code, the financial code included in the financial codes;

associating a sign-off deadline with the data category;

permitting access to financial data included in the financial data entry;

permitting, by a processor, a sign-off of the financial data for a financial period only before the sign-off deadline on any financial data entries corresponding to the financial code;

displaying past financial data entries, wherein the financial data entry applies to a current financial period, the past financial data entries correspond to the financial data entry, and the past financial data entries apply to a plurality of financial periods prior to the current financial period; and calculating a variance value from the financial data entry and the past financial data entries.

* * * * *